UNITED STATES PATENT OFFICE.

FRANCIS J. BOLTON, OF 19 GROSVENOR GARDENS, AND JAMES A. WANKLYN, OF 7 WESTMINSTER CHAMBERS, COUNTY OF MIDDLESEX, ENGLAND.

PROCESS OF MANUFACTURING ARTIFICIAL MANURES.

SPECIFICATION forming part of Letters Patent No. 236,763, dated January 18, 1881.

Application filed September 4, 1880. (No specimens.) Patented in Great Britain November 24, 1879.

*To all whom it may concern:*

Be it known that we, FRANCIS JOHN BOLTON and JAMES ALFRED WANKLYN, citizens of England, residing, respectively, at 19 Grosvenor Gardens and at 7 Westminster Chambers, both in the county of Middlesex, England, have invented an Improved Manufacture of Artificial Manures and Ammoniacal Products, (for which we have received Letters Patent in England, No. 4,781, dated November 24, 1879;) and we do hereby declare that the following is a full, clear, and exact description of the invention, which will enable others skilled in the art to which it appertains to make and use the same.

In order to render urine practically applicable as manure, it is essentially necessary to obtain therefrom the urine solids in a concentrated or more or less dry form—that is to say, to get rid of the large mass of water by which these are held in solution. According to contemporary chemistry, it has been considered impossible to apply the requisite degree of heat for effecting the rapid and effectual evaporation of the water without destroying the urea and driving off more or less of the ammonia. Thus Gerhard, in his Organic Chemistry, Vol. I, p. 406, says: "A solution of urea can be boiled in a large quantity of water without its becoming decomposed; but if the solution is very concentrated the boiling disengages some ammonia, because some portion of the urea becomes heated to more than 100° centigrade."

Now the essential feature of the present invention is the discovery by us that, contrary to the prevailing opinion of chemists, urine can be subjected to a heat of 100° centigrade, and even higher, in the presence of a small proportion of charred substances, such as soot or charcoal, without in any way destroying the urea, and that, consequently, we are enabled rapidly to evaporate large masses of urine practically to dryness, so as to obtain the urine solids therefrom in a highly-concentrated form, without loss of ammonia.

The average quantity of solid matter held in solution in urine is about four per cent., (apparently rather more than less,) by weight. This solid matter we obtain by evaporation, so as to produce a rich manure. From the product so obtained ammonia can be extracted by the usual methods. The solid matter contains nitrogen in great abundance, equivalent to thirty parts of ammonia per one hundred parts of urine solids. Phosphoric acid—for the most part in the state of soluble phosphates—occurs to the extent of five parts per one hundred parts of urine solids; also, potassium salts equivalent to four parts of potassium.

In carrying out our invention we proceed as follows: We mix the urine, as fresh as is practicable, with about one-fifth of its weight of soot, or of charcoal in a granular condition, and then apply heat of about 212° Fahrenheit, or a little over, until the greater part of the water has evaporated off. We then add more urine to the partially-dried mass and continue the evaporation. We repeat this process many times, and ultimately dry up and obtain a mass consisting of urine solids mixed with more or less charcoal or soot, and that product is the artificial manure which we propose to manufacture.

We find that carbonaceous matter in the form of soot is used with great advantage. We also, in some cases, use charcoal, which we obtain by taking sawdust or comminuted woody or vegetable fibers, and treating them in a closed vessel with superheated steam. Instead of charcoal, other charred porous or absorbent substances in a granulated condition may be used, such as the carbonaceous residues of destructive distillation or bone-earth, which latter we should employ where an increased quantity of phosphoric acid was required.

In practice we employ urine containing the urea either all together intact or for the most part intact. This desideratum is realized when the urine is quite fresh and clean, and before the natural slight acidity of the urine has departed and given place to alkalinity. This desideratum is also realized when the urine, although old, has been preserved from fermentation by any suitable antiseptic. Lastly, this desideratum is realized in some cases when the urine has become alkaline and foul, and mixed with fæces and other débris, the essential point being that the ureal fermentation shall be only in the incipient stage—that is to say, that the urea is, for the most part, intact or undecomposed.

We employ the urine, which we use in the state of fresh urine or preserved by antiseptic, also when it is old or mixed with fæces, provided that the destruction of the urea is only partial. We take such urine as we have just specified and heat it as rapidly as practicable to the boiling-point of water, or even a little above that temperature, and evaporate or boil down at about that temperature, and we make an addition of a little soot or charcoal, or bone-earth, or mixtures of soot with charcoal or with bone-earth, either before the commencement of the evaporation or during the evaporation. The proportions of soot may be varied, say, from one in one thousand, by weight, of the liquid urine up to any convenient proportions.

In its early stages the evaporation may be performed over the naked flame or fire, (in a steam-boiler, for instance,) and the escaping steam may be condensed, so as to avoid nuisance. When the urine has become very concentrated—as, for instance, when the residue in the boiler contains about equal parts of water and solids—then caution becomes requisite, and the further evaporation or drying must be conducted in the steam-bath. The steam for this purpose may be economically furnished by the boiler wherein the first stages of the evaporation are being carried on.

In place of carrying on the evaporation of the urine and the drying up of the solid product at the ordinary atmospheric pressure, resort may be had to the vacuum-pan, (just as in the refining of sugar,) and in some instances advantage will arise from such a procedure from the facilities which it gives for the avoidance of nuisance.

In conclusion, it may be pointed out that in boiling down the urine in the presence of a small quantity of charred material, according to our invention, any tendency of the urine to putrefy is immediately arrested, so that the urea is obtained in its original undecomposed state; whereas, in the processes heretofore proposed, such as have been above referred to, the urine, being exposed for a great length of time to the action of the atmosphere, while evaporating slowly at a very low temperature in contact with large masses of sawdust, &c., will become more or less putrefied before the stage of dryness is reached, and consequently the small quantity of urea that is thus combined with the inert mass of sawdust will have become decomposed, rendering the compound comparatively valueless as a manure.

Having thus described the nature of our invention and in what manner the same is to be performed, we wish it to be understood that we do not claim the mixing of urine with large masses of sawdust or similar absorbent material and then evaporating the watery particles at a low temperature; but

We claim—

The method of evaporating urine at or about a temperature of 100° centigrade, in contact with a small proportion of soot, charcoal, burned bones, or other charred absorbent materials, so as to produce a compound containing the solid constituents of urine in a condition suitable for manure, essentially as set forth.

In testimony whereof we have signed our names to this specification, in the presence of two subscribing witnesses, this 13th day of August, A. D. 1880.

FRANCIS JOHN BOLTON.
J. ALFRED WANKLYN.

Witnesses to the signature of Francis John Bolton:
JNO. DEAN,
J. WATT,
*Both of No. 17 Gracechurch Street, London.*

Witnesses to the signature of James Alfred Wanklyn:
G. W. WESTLERY,
JNO. DEAN,
*Both of No. 17 Gracechurch Street, London.*